United States Patent
Bode

(10) Patent No.: US 6,508,128 B2
(45) Date of Patent: *Jan. 21, 2003

(54) METHOD AND DEVICE FOR MONITORING A BEARING ARRANGEMENT

(75) Inventor: Jens Bode, Dreieich (DE)

(73) Assignee: SKF GmbH, Schweinfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/835,405

(22) Filed: Apr. 17, 2001

(65) Prior Publication Data

US 2001/0037685 A1 Nov. 8, 2001

(30) Foreign Application Priority Data

Apr. 19, 2000 (DE) .......................................... 100 19 324

(51) Int. Cl.[7] .............................................. G01N 29/12
(52) U.S. Cl. .............................. 73/593; 73/579; 73/602; 73/660
(58) Field of Search .......................... 73/593, 599, 600, 73/602, 660, 661, 662, 663, 605, 1.13, 1.15, 432.1, 659; 340/635; 702/35, 56

(56) References Cited

U.S. PATENT DOCUMENTS

| | | | | |
|---|---|---|---|---|
| 4,286,467 A | * | 9/1981 | Kober ........................... | 73/593 |
| 4,614,117 A | * | 9/1986 | Taniguti ....................... | 73/659 |
| 4,884,449 A | * | 12/1989 | Nishimoto et al. ............ | 73/660 |
| 4,941,105 A | * | 7/1990 | Marangoni ................... | 73/660 |
| 4,980,844 A | * | 12/1990 | Demjanenko et al. ........ | 73/660 |
| 5,005,417 A | * | 4/1991 | Kawasaki et al. ............ | 73/593 |
| 5,423,218 A | * | 6/1995 | Matsuzaki .................... | 73/593 |
| 5,663,894 A | * | 9/1997 | Seth et al. ..................... | 73/654 |
| 5,677,488 A | * | 10/1997 | Monahan et al. ............. | 73/593 |
| 5,955,670 A | * | 9/1999 | Goodman et al. ............ | 73/592 |
| 6,053,047 A | * | 4/2000 | Dister et al. .................. | 73/593 |
| 6,070,325 A | * | 6/2000 | Miyata et al. ........... | 29/898.09 |
| 6,122,966 A | * | 9/2000 | Goodman et al. ............ | 73/593 |
| 6,161,962 A | * | 12/2000 | French et al. ................ | 384/459 |
| 6,257,066 B1 | * | 7/2001 | Chandler et al. ............. | 73/660 |
| 6,260,604 B1 | | 7/2001 | Lippold et al. .............. | 164/454 |
| 6,289,735 B1 | * | 9/2001 | Dister et al. .................. | 73/579 |
| 6,297,742 B1 | * | 10/2001 | Canada et al. ............... | 340/635 |
| 6,321,602 B1 | * | 11/2001 | Ben-Romdhane ............ | 73/660 |
| 6,339,961 B1 | * | 1/2002 | Goodman et al. ............ | 73/593 |

FOREIGN PATENT DOCUMENTS

| | | |
|---|---|---|
| DE | 198 29 605 C1 | 10/1999 |
| EP | 0 493 790 A2 | 7/1992 |

* cited by examiner

Primary Examiner—Hezron Williams
Assistant Examiner—Jacques M. Saint-Surin
(74) Attorney, Agent, or Firm—Burns, Doane, Swecker & Mathis, L.L.P.

(57) ABSTRACT

A method and device for monitoring a bearing arrangement, having at least one bearing, in a housing of a roller journal bearing of a roller in a continuous casting installation are designed to initiate upkeep or repair work on the bearing arrangement at the correct time. The method involves measuring a value of a process quantity at the bearing or in an area adjoining the bearing, providing an evaluation device with the measured value of the process quantity, comparing the measured value with a stored preset value, and triggering a signal as soon as the measured value exceeds or falls below the stored preset value.

28 Claims, 2 Drawing Sheets

METHOD AND DEVICE FOR MONITORING A BEARING ARRANGEMENT

Figure 1:
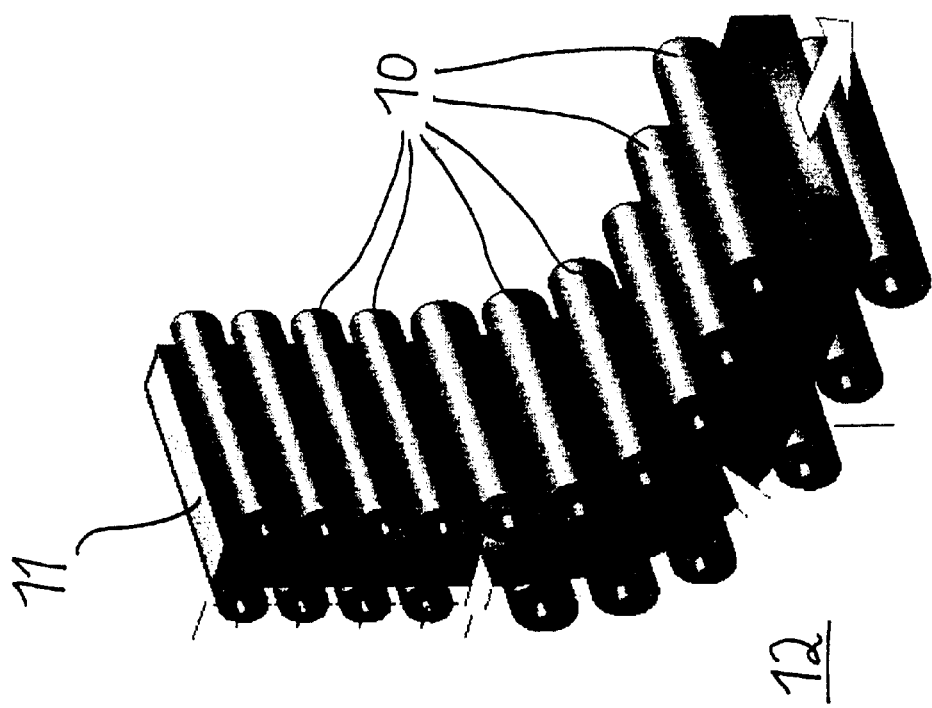

This application is based on and claims priority under 35 U.S.C. §119 with respect to German Application No. P 100 19 324.2 filed on Apr. 19, 2000, the entire content of which is incorporated herein by reference.

FIELD OF THE INVENTION

The invention generally relates to bearing arrangements. More particularly, the present invention pertains to a method and device for monitoring a bearing arrangement, having at least one bearing, in a housing of a roller journal bearing of a roller in a continuous casting installation.

BACKGROUND OF THE INVENTION

Metal coming from above from a casting die, which has been preformed and is still hot, is deflected by 90° in a continuous casting installation and is then guided in the horizontal direction for further processing. Although the metal leaving the casting die is still hot, it is sufficiently solidified so that it is necessary to provide considerable force for performing the deflection by 90° from the vertical to the horizontal direction. For this purpose, a roller arrangement is provided. The roller arrangement has a multitude of rollers and causes slow "bending" of the metal billet.

The rollers in the roller arrangement are arranged in an appropriate frame. The rollers have a journal at each of their two ends which is seated in a housing. A bearing arrangement is provided between the housing and the bearing journal.

The quality of the continuous casting process, as well as its efficiency, is essentially determined by the ability of the bearing arrangement to function. It is thus necessary to ensure that no bearing damage occurs over time. This can be accomplished through use of preventive maintenance at fixed intervals of time.

However, performing preventative maintenance at specified time intervals invariably results in the performance of preventive maintenance at times when the bearing does not necessarily require such maintenance.

A need thus exist for a method and associated device for monitoring a bearing arrangement of a bearing (e.g., roller journal bearing) of a roller in a continuous casting installation in a way that makes it possible to control the upkeep, maintenance and/or restoration of the bearing arrangement, as well as its surroundings, in such a way that the upkeep, maintenance and/or restoration is generally only actually triggered when there is a real need.

SUMMARY OF THE INVENTION

One aspect of the invention involves a method for monitoring a bearing arrangement of a roller journal bearing of a roller in a continuous casting installation that includes measuring a value of a process quantity at the bearing or in an area adjoining the bearing, providing an evaluation device with the measured value of the process quantity, comparing the measured value with a stored preset value, and triggering a signal when the measured value exceeds or falls below the stored preset value.

The present invention is thus based on the discovery that a process quantity associated with a bearing device of a roller journal bearing of a roller in a continuous casting installation is characteristic of the roller journal bearing's ability to function, or of the operational dependability of the roller journal bearing. By monitoring or measuring the process quantity through use of a suitable sensor, the measured or monitored value of the process quantity can then be compared, preferably on a permanent and ongoing or continual basis, with a maximum or minimum threshold value which has been stored in a memory as a marginal threshold value required for the orderly operation of the bearing arrangement. Through comparison of the actual value with the nominal or threshold value, it is possible to trigger or initiate a signal when a permissible tolerance range is exceeded, thus providing the operator of the continuous casting installation with a warning that maintenance or replacement work on the respective roller journal bearing, or its surroundings, is necessary.

In accordance with one version of the present invention, the process quantity that is monitored is the force acting on the bearing. This can include the force acting in the axial direction of the bearing and/or the force acting in the radial direction of the bearing. Various force measuring bearings for measuring these forces are known in the art and used in other contexts. The stored threshold value for the maximum possible bearing force would be of such a magnitude that a response of the monitoring system, i.e., the triggering of a signal, occurs if, for example, forces act on the roller bearing reach an inadmissible magnitude. This could be due to, for example, wear in the vicinity of the bearing or could be due to other irregularities such as a tilted roller positioning in the frame.

Further, as an alternative to monitoring the force acting on the bearing, or in addition to monitoring such force, the monitored or measured process quantity can be the moisture in the bearing, or the moisture content of the lubricant in the bearing. It has been found that bearing damage occurs if an inadmissibly high amount of moisture is contained in the bearing. It is thus possible through use of a moisture sensor to measure and monitor the moisture at suitable positions of the bearing or in the surroundings of the bearing. The monitored or measured value of the moisture can then once again be compared to a stored threshold value so that if the monitored or measured value exceeds the stored value, a signal or warning is issued indicating that maintenance or replacement work on the respective roller journal bearing, or its surroundings, is required.

It is further possible as an alternative to, or in addition to, monitoring the force acting on the bearing and/or the moisture as described above, to monitor or measure the temperature prevailing in the bearing. In this connection the temperature of the outer ring is primarily considered because it can be measured in a relatively simple manner.

As an alternative to or in addition to one or more of the process quantities mentioned above, the process quantity on which monitoring is based can be the elastic or plastic deformation of the housing. In this case, the deformation can be measured in the circumferential direction of the housing, which thus provides a value indicating the ovalness of the housing, or can be measured in the axial direction of the housing. In the latter case the cylindrical characteristics of the housing are monitored. The deformation of the housing to be measured here typically occurs in the form of a superimposition of elastic, and of possibly present plastic deformation. It has been found that when defined threshold values of the deformation of the housing are reached, the service life of the bearing is clearly reduced. Thus, monitoring the deformation of the housing provides a reliable indication of a required repair or restoration of the housing.

As an alternative to or in addition to one or more of the process quantities mentioned above, the process quantity that is monitored or measured can be the vibration amplitude and/or vibration frequency of a preset area of the bearing. It is also possible to monitor the vibration acceleration of a selected or preset area of the bearing. Monitoring or measuring the vibration property of a bearing, and preferably the statistical evaluation thereof (amplitudes, frequencies, accelerations), can be used as an indicator for deciding when it is necessary to service, or replace, the bearing.

A still further process quantity which can be monitored or measured as an alternative to or in addition to one or more of the process quantities mentioned above is the number of revolutions of a bearing. This can be of particular importance in case of continuous casting installations as normally the number of revolutions of the rollers is not subjected to any particular monitoring.

In accordance with the various aspects of the present invention described above, it is envisioned that the measured or monitored value can be transmitted in a wireless manner. In this regard, the transmission can take place by induction as well as by radio.

According to another aspect of the invention, a device for monitoring a bearing arrangement, having at least one bearing, in a housing of a roller journal bearing of a roller in a continuous casting installation includes at least one sensor which senses a process quantity at a bearing or in an area adjoining the bearing, a mechanism for conducting the measured value of the process quantity to an evaluation device, a mechanism for comparing the measured value with a stored preset value, and a mechanism for triggering a signal as soon as the measured value exceeds or falls below the stored preset value.

Depending on the particular application or context of use, the sensor for monitoring or measuring the process quantity at the bearing or in the area adjoining the bearing can be a force sensor, a moisture sensor, a temperature sensor, a deformation sensor (e.g., one or several wire strain gauges) and/or a velocity or acceleration sensor.

The bearing preferably is a rolling bearing, a double row swivel-joint roller bearing, or a single or double row toroidal bearing.

In accordance with a further development of the present invention, the mechanism for conducting the measured value of the process quantity to the evaluation device can transmit this value in a wireless manner, preferably by induction, infrared signals or radio waves.

It is possible by way of the present invention to monitor various process quantities at a roller journal bearing of a roller in a continuous casting installation, and to use the measured or monitored process quantity(s) to draw specific conclusions regarding the necessary time for taking certain measures, including servicing or replacing the bearing. It is thus possible to initiate suitable activities at the right moment for performing replacement of the bearing arrangement at the start of bearing damage. It is also possible to improve and better optimize the entire production process of the continuous casting installation.

The invention is also applicable to the housing and the area surrounding the housing in the frame itself. Here, too, is it possible by way of the described actions to ensure that a replacement part is installed at the right moment. Wear in the area of the roller journal bearing can be made noticeable by measuring and monitoring the process quantities in question, thus providing an automatic indication at the correct time that maintenance work is required. This can provide an increased dependability with respect to unplanned outages, as well as the possibility of directly identifying the source(s) of malfunctions.

BRIEF DESCRIPTION OF THE DRAWING FIGURES

Figure 2:
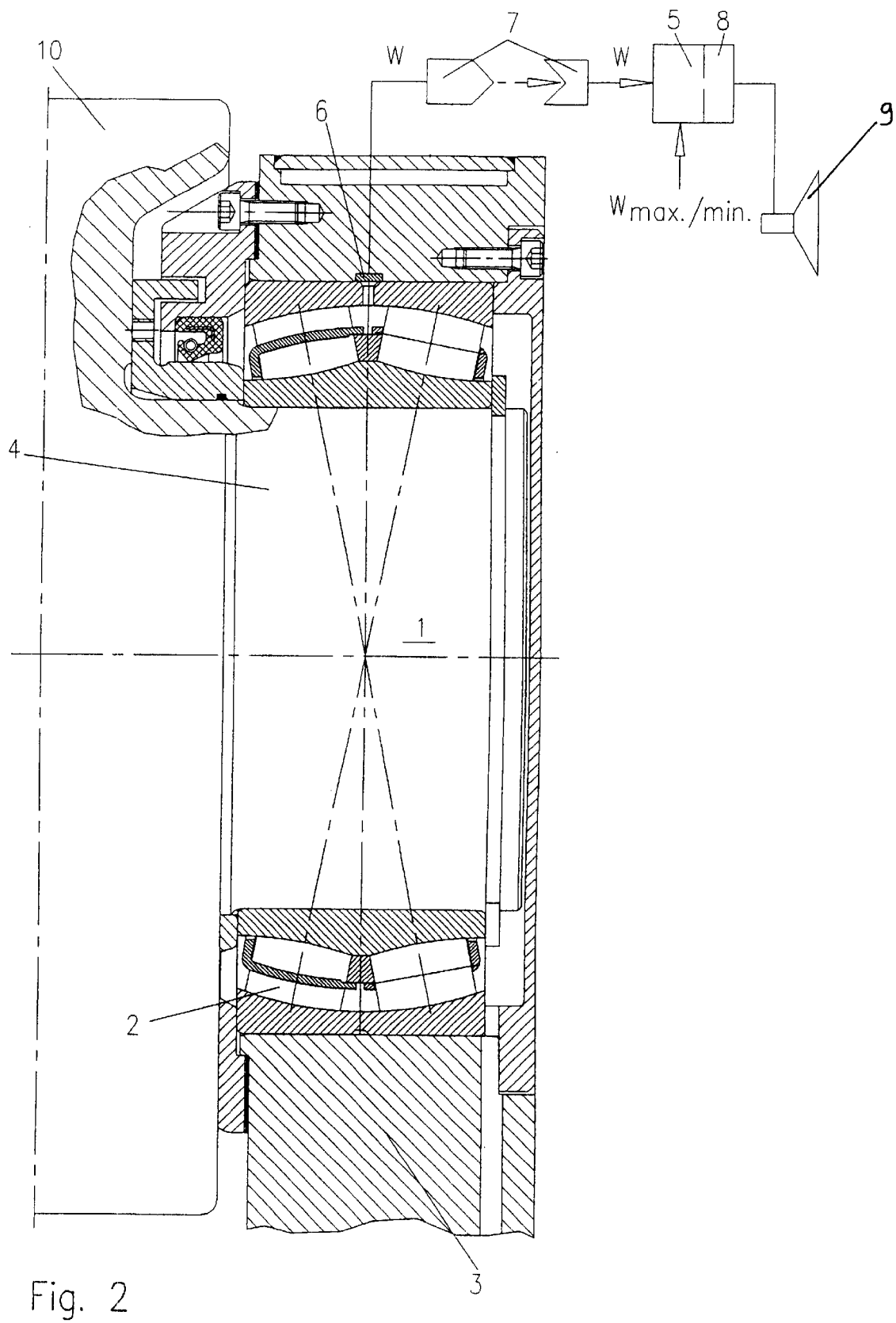

The foregoing and additional features and characteristics of the present invention will become more apparent from the following detailed description considered with reference to the accompanying drawing figures in which like reference numerals designate like elements and wherein:

FIG. 1 is a perspective view of a roller arrangement in a continuous casting installation; and FIG. 2 is a cross-sectional view of a roller journal bearing used with the roller arrangement shown in FIG. 1, including the device for measuring or monitoring one or more process quantities of the bearing.

DETAILED DESCRIPTION OF THE INVENTION

FIG. 1 illustrates a continuous casting installation 12. As shown in FIG. 1, hot metal which is generally dimensionally stable and in the form of a hot metal billet or cast metal 11 arrives vertically above from a casting die. It is necessary to "bend" the metal billet from the vertical direction into the horizontal direction, and this requires relatively considerable force as the dimensional stability of the metal 11 is already quite considerable. To "bend" the metal billet 11, a system or plurality of rollers 10 is employed. The rollers 10 are positioned in such a way that a slow bending of the metal billet 11 into a horizontal direction takes place.

The individual rollers 10 are seated at their respective ends through use of roller journals. FIG. 2 shows the end of one of the rollers 10 with its roller journal 4. The roller journal 4 is seated in a housing 3 by way of a bearing arrangement 1. In the illustrated embodiment, the bearing arrangement 1 for seating the roller journal 4 is in the form of a swivel-joint roller bearing 2.

As shown in FIG. 2, a sensor 6 is integrated at a suitable location into the bearing arrangement 1 and/or the housing 3. The sensor can be in one of several forms, depending upon the process quantity(s) or parameter(s) to be measured or monitored. One possibility is a force sensor. Here, a force-measuring bearing can be equipped with a force sensor. It is also possible, as an alternative to or in addition to the force sensor, to integrate moisture and/or temperature sensors into the bearing. In the same way it is also possible, as an alternative to or in addition to one or more of the sensors mentioned above, to detect the deformation of the bearing arrangement through use of an appropriate sensor (e.g., by an appropriate arrangement and connection of wire strain gauges). Finally, acceleration or distance sensors can be integrated into the bearing for recording vibrations, once again as an alternative to or in addition to one or more of the various sensors mentioned above. It is thus envisioned that the various sensors mentioned above can be used individually or can be employed in any desired combinations, depending upon the process quantities or parameters to be measured. Suitable sensors to be employed in the present invention for measuring or monitoring the process quantities or parameters mentioned above are known in the art and are thus not described in detail here.

The sensor 6 conducts the detected or measured process quantity W to an evaluation device 5. A suitable mechanism 7 is provided for conducting the measured or detected value to the evaluation device. The dashed arrow in FIG. 2 illustrates that the transmission of the measured or detected value of the process quantity W can also take place in a wireless manner, for example by radio, infrared or induction.

In addition to the measured value of the process quantity W, the evaluation device 5 also receives a stored preset value $W_{max/min}$ relating to the process quantity(s) that is measured or detected. A comparator 8 forming a comparing device compares the measured value W with the preset value $W_{max/min}$. The comparator 8 carries out the comparison to determine whether the measured value W lies within the permissible tolerance range or nominal value. That is, the comparator 8 assesses whether the measured or detected value of the process quantity(s) W is still less than a permissible maximum value or greater than a permissible minimum value. In most cases, the measured value will be compared with a preset maximum value for force, moisture, temperature or deformation as the maximum value will likely be of most importance.

If the preset tolerance range or the preset maximum/minimum value for the measured process quantity is exceeded, an appropriate device 9 triggers or produces output of a signal, providing an indication that the tolerance range has been exceeded. This can take place in a variety of different ways, for example by indicator lights or by acoustical signals. This signal informs the operator(s) of the continuous casting installation that permissible operating parameters have been exceeded. With this warning or notification, it is then possible to initiate maintenance work with respect to the bearing so that there is no loss of the bearing.

As mentioned above, one possible sensor which can be employed in the present invention for monitoring a process quantity associated with the bearing or an area adjoining the bearing is a suitable force sensor for measuring, monitoring or detecting the force acting on the bearing. The force to be measured or monitored can be the force acting in the bearing axial direction and/or the force acting in the bearing radial direction. The stored threshold value for the maximum possible bearing force would be of such a magnitude that a response of the monitoring system, i.e., the triggering of a signal, occurs if, for example, forces act on the roller bearing reach an inadmissible magnitude. This could be due to, for example, wear in the vicinity of the bearing or could be due to other irregularities such as a tilted roller positioning in the stand.

As mentioned above, another process quantity W of the bearing or the area adjoining the bearing that can be monitored is the moisture in the bearing or the moisture content of the lubricant in the bearing. Thus, the sensor can be adapted to measure or monitor the moisture in the bearing, or the moisture content of the lubricant in the bearing. Experience has shown that bearing damage can occur if an inadmissibly high amount of moisture is contained in the bearing. A suitable moisture sensor can thus be used to measure and monitor the moisture at suitable positions of the bearing or in the surroundings of the bearing. The monitored or measured value of the moisture is then compared to a stored threshold value so that if the detected or measured value exceeds the stored value, a signal or warning is issued indicating that maintenance or replacement work on the respective roller journal bearing, or its surroundings, is required.

As mentioned above, a further type of sensor which can be employed to monitor a process quantity of the bearing or an area adjoining the bearing is a sensor for measuring or monitoring the temperature prevailing in the bearing. The temperature of the outer ring is one preferred area for temperature measurement because the outer ring temperature can be measured in a relatively simple manner.

A further type of sensor mentioned above is a sensor that measures or monitors the elastic or plastic deformation of the housing. The deformation can be measured in the circumferential direction of the housing to thus provide a value indicating the ovalness of the housing, or can be measured in the axial direction of the housing to provide a value indicating the axial or cylindrical characteristics of the housing. The deformation of the housing to be measured here typically occurs in the form of a superimposition of elastic, and possibly present plastic deformation. Experience has shown that when defined threshold values of the deformation of the housing are reached, the service life of the bearing is reduced. Thus, monitoring the deformation of the housing provides a reliable indication that a repair or restoration of the housing is required.

Another type of sensor which can be employed is one that measures or monitors the vibration amplitude and/or vibration frequency of a preset area of the bearing. It is also possible to monitor the vibration acceleration of a selected area of the bearing. Monitoring or measuring the vibration property of a bearing, including the statistical evaluation of the vibration property (amplitudes, frequencies, accelerations) can be used to indicate when it is necessary to service or replace the bearing.

The sensor can also be one which monitors or measures the number of revolutions of the bearing.

It is to be understood that through suitable positioning and arrangement of sensors, the present invention can be implemented to monitor or measure one of the process quantities mentioned above or various combinations of the process quantities mentioned above.

The present invention is described and illustrated in the context of a roller having a journal at its end, as is often the case, which is seated by way of the bearing arrangement. However, as an alternative, the roller can be provided with an interior bore in both of its end areas, into each of which a journal projects, which is attached to the housing. In this alternative, the bearing would arranged between this journal and the cylindrical interior face of the bore.

In addition, in the bearing arrangement 1 described above, the bearing 2 is in the form of a swivel-joint roller bearing. However, it is to be understood that the bearing 2 in the bearing arrangement could take other forms such as a single row toroidal bearing or double row toroidal bearing.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for monitoring a bearing arrangement in a continuous casting installation which includes a plurality of rollers each provided with a journal seated in a housing by way of said bearing arrangement, the bearing arrangement having at least one bearing, the method comprising:

measuring a value of a process quantity at the bearing or the housing by way of a sensor mounted in the bearing arrangement or the housing;

providing an evaluation device with the measured value of the process quantity;

comparing the measured value with a stored preset value; and triggering a signal when the measured value exceeds or falls below the stored preset value.

2. The method in accordance with claim 1, wherein the measurement of the value of the process quantity includes measuring a force acting on the bearing.

3. The method in accordance with claim 2, wherein the force acting on the bearing is the force acting in an axial direction of the bearing.

4. The method in accordance with claim 2, wherein the force acting on the bearing is the force acting in the radial direction of the bearing.

5. The method in accordance with claim 1, wherein the measurement of the value of the process quantity includes measuring moisture present in the bearing or measuring moisture content of lubricant for the bearing.

6. The method in accordance with claim 1, wherein the measurement of the value of the process quantity includes measuring a temperature prevailing in the bearing.

7. The method in accordance with claim 1, wherein the measurement of the value of the process quantity includes measuring a temperature prevailing in an outer ring of the bearing.

8. The method in accordance with claim 1, wherein the measurement of the value of the process quantity includes measuring deformation of the housing.

9. The method in accordance with claim 8, wherein the deformation of the housing is measured in the circumferential direction of the housing.

10. The method in accordance with claim 8, wherein the deformation of the housing is measured in an axial direction of the housing.

11. The method in accordance with claim 1, wherein the measurement of the value of the process quantity includes measuring at least one of a vibration amplitude of an area of the bearing and a vibration frequency of an area of the bearing.

12. The method in accordance with claim 1, wherein the measurement of the value of the process quantity includes measuring a vibration acceleration of an area of the bearing.

13. The method in accordance with claim 1, wherein the measurement of the value of the process quantity includes measuring a number of revolutions of the bearing.

14. The method in accordance with claim 1, wherein the measured value is transmitted in a wireless manner.

15. The method in accordance with claim 14, wherein the wireless transmission takes place by way of induction.

16. The method in accordance with claim 14, wherein the wireless transmission takes place by way of radio.

17. A continuous casting installation which processes metal from a casting die, comprising:

a plurality of rollers each provided with a roller journal seated in a housing by way of a bearing arrangement, the bearing arrangement including at least one bearing;

at least one sensor mounted in the bearing arrangement or the housing which monitors a value of a process quantity at the bearing or the housing;

conducting means for conducting the monitored value of the process quantity to an evaluation device;

comparing means for comparing the monitored value with a stored preset value; and means for triggering a signal when the measured value exceeds or falls below the stored preset value.

18. The device in accordance with claim 17, wherein the sensor is a force sensor.

19. The device in accordance with claim 17, wherein the sensor is a moisture sensor.

20. The device in accordance with claim 17, wherein the sensor is a temperature sensor.

21. The device in accordance with claim 17, wherein the sensor is a deformation sensor.

22. The device in accordance with claim 21, wherein the deformation sensor is a wire strain gauge.

23. The device in accordance with claim 17, wherein the sensor is one of a velocity sensor and an acceleration sensor.

24. The device in accordance with claim 17, wherein the bearing is a roller bearing.

25. The device in accordance with claim 17, wherein the bearing is a double row swivel-joint roller bearing.

26. The device in accordance with claim 17, wherein the conducting means transmits the monitored value in a wireless manner.

27. The device in accordance with claim 26, wherein the wireless manner is by induction or radio.

28. A continuous casting installation comprising;

a plurality of rollers each provided at its ends with a bearing arrangement seated in a housing, the bearing arrangement including at least one bearing;

at least one sensor positioned in the bearing arrangement or the housing to monitor a value of one of:
a force acting on the bearing;
moisture in the bearing or a moisture content of lubricant in the bearing;
temperature prevailing in the bearing;
deformation of the housing;
vibration frequency or vibration amplitude of the bearing;
vibration property of the bearing;
number of revolutions of the bearing, comparing means for comparing the monitored value with a stored preset value; and means for producing a signal when the measured value exceeds or falls below the stored preset value.

* * * * *